United States Patent
Li et al.

(10) Patent No.: US 8,055,032 B2
(45) Date of Patent: Nov. 8, 2011

(54) DIGITAL CAMERA WITH FINGERPRINT IDENTIFICATION FUNCTION

(75) Inventors: Shi-Gang Li, Guangdong (CN);
Huan-Hai Xu, Guangdong (CN)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 776 days.

(21) Appl. No.: 12/166,273

(22) Filed: Jul. 1, 2008

(65) Prior Publication Data

US 2009/0097718 A1 Apr. 16, 2009

(30) Foreign Application Priority Data

Oct. 16, 2007 (CN) .......................... 2007 1 0202083

(51) Int. Cl.
*G06K 9/00* (2006.01)
(52) U.S. Cl. ........................................................ 382/124
(58) Field of Classification Search .................. 382/115, 382/124, 209, 218; 348/161
See application file for complete search history.

(56) References Cited

U.S. PATENT DOCUMENTS

| | | | |
|---|---|---|---|
| 6,433,818 B1 * | 8/2002 | Steinberg et al. | 348/161 |
| 6,930,707 B2 | 8/2005 | Bates et al. | |
| 7,016,520 B2 * | 3/2006 | Butterworth | 382/124 |
| 7,215,793 B2 | 5/2007 | Takahashi | |
| 7,382,397 B2 * | 6/2008 | Mottur | 348/142 |
| 2002/0083329 A1 * | 6/2002 | Kiyomoto | 713/186 |
| 2006/0045514 A1 | 3/2006 | Matsushita et al. | |
| 2007/0245153 A1 * | 10/2007 | Richtsmeier et al. | 713/186 |
| 2008/0309794 A1 * | 12/2008 | Milgramm | 348/231.99 |

FOREIGN PATENT DOCUMENTS

| | | |
|---|---|---|
| CN | 1315712 A | 10/2001 |
| CN | 1595423 A | 3/2005 |
| CN | 1959693 A | 5/2007 |

* cited by examiner

*Primary Examiner* — Daniel Mariam
(74) *Attorney, Agent, or Firm* — Altis Law Group, Inc.

(57) ABSTRACT

A digital camera includes a fingerprint input interface, a fingerprint sensor, a fingerprint information storage unit, and a fingerprint identification module. The fingerprint input interface is for a current user to input the current user's fingerprint. The fingerprint sensor is for reading the current user's fingerprint and getting characteristics of the current user's fingerprint. The fingerprint information storage unit is for storing predefined characteristics of authorized users' fingerprints and access privilege settings of different users. The fingerprint identification module is for an administrator of the digital camera to set access privileges of different users according to the users' fingerprints, and authorizing the current user to access operations of the digital camera, and restricting access to operations of the digital camera according to whether the characteristics of the current user's fingerprint match the predefined characteristics of the authorized users' fingerprints.

3 Claims, 3 Drawing Sheets

Fingerprint Information Storage Unit

| | | |
|---|---|---|
| First Fingerprint | Level 1 | Access privilege: all operations of the imaging device. |
| Second Fingerprint | Level 2 | Access privilege: turning on, taking picture, browsing&processing pictures taken by the user himself, browsing pictures taken by other users except the level-1 user. |
| Third Fingerprint | Level 3 | Access privilege: turning on, taking picture, browsing&processing pictures taken by the user himself. |
| Fourth Fingerprint | Level 2 | Access privilege: turning on, taking picture, browsing&processing pictures taken by the user himself, browsing pictures taken by other users except the level-1 user. |
| ... | ... | ... |

FIG. 2

DIGITAL CAMERA WITH FINGERPRINT IDENTIFICATION FUNCTION

BACKGROUND

1. Field of the Invention

The present invention relates to a digital camera with a fingerprint identification function.

2. Description of the Related Art

Digital cameras are widely used for taking pictures, some of which might be important to people who own the cameras. However, when the digital camera is borrowed, lost, or stolen, pictures in the digital camera may be accessed by unauthorized people.

What is needed, therefore, is to provide a digital camera, in which the above problem is eliminated or at least alleviated.

SUMMARY

The present invention relates to a digital camera. The digital camera includes a fingerprint input interface, a fingerprint sensor, a fingerprint information storage unit, and a fingerprint identification module. The fingerprint input interface is for a current user to input their fingerprint. The fingerprint sensor is for reading the current user's fingerprint and getting characteristics of the current user's fingerprint. The fingerprint information storage unit is for storing predefined characteristics of authorized users' fingerprints and access privilege settings of different users. The fingerprint identification module is for an administrator of the digital camera to set access privileges of different users according to the users' fingerprints, and authorizing the current user to access to operations of the digital camera, and restricting access to operations of the digital camera according to whether the characteristics of the current user's fingerprint match the predefined characteristics of one of the authorized users' fingerprints.

Other advantages and novel features of the present invention will become more apparent from the following detailed description of exemplary embodiments when taken in conjunction with the accompanying drawings.

BRIEF DESCRIPTION OF THE DRAWINGS

FIG. 2 shows a schematic layout of information stored in the fingerprint information storage unit of FIG. 1.

DETAILED DESCRIPTION OF THE EMBODIMENTS

Reference will now be made to the figures to describe an exemplary embodiment in detail.

Figure 1:
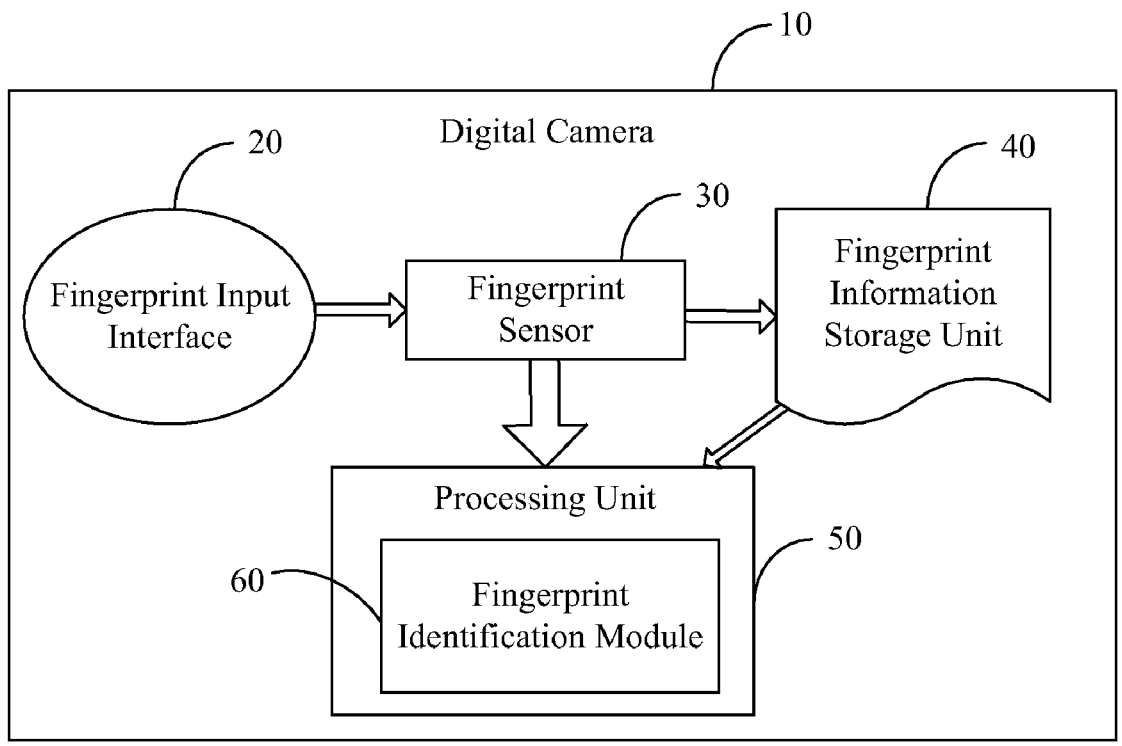
FIG. 1 is a structural block diagram of a digital camera according to an exemplary embodiment.

Referring to FIG. 1, a digital camera 10, according to an exemplary embodiment, is shown. In addition to general elements, units, and modules that a typical digital camera has, the digital camera 10 further includes a fingerprint input interface 20, a fingerprint sensor 30, a fingerprint information storage unit 40, and a processing unit 50. The processing unit 50 includes a fingerprint identification module 60.

The fingerprint input interface 20 is used for a user to input his fingerprint. The user may touch the fingerprint input interface 20 to input a fingerprint. The user can be an authorized user, such as an owner of the digital camera or a temporary user (e.g., a borrower), or an unauthorized user. The fingerprint sensor 30 is configured for reading the user's fingerprint and getting characteristics of the user's fingerprint.

The fingerprint information storage unit 40 is configured for storing characteristics of authorized users' fingerprints. A list of authorized users is set by an owner of the digital camera. Referring to FIG. 2, the fingerprint information storage unit 40 further stores respective users' access privileges as set by the owner of the digital camera in the list.

The processing unit 50 is configured for identifying the user according to the characteristics of the user's fingerprint using the fingerprint identification module 60.

The fingerprint identification module 60 is used for the administrator to set up users' access privileges. Following are detailed examples. A first user with a first fingerprint (e.g., the administrator's fingerprint) is authorized to access all operations of the digital camera 10, which we will call level 1 privilege. The operations the level 1 user may do include turning on the digital camera 10, taking pictures, and browsing/editing/transferring pictures stored in the digital camera 10 etc. A second user with a second fingerprint has restricted access privilege and may only access some operations of the digital camera 10, which we will call level 2 privilege, for example, the level 2 user may turn on the digital camera 10, take pictures, process pictures taken by the user himself, and browse pictures only taken by other authorized users except the level-1 user. A third user with a third fingerprint has even more restricted access privilege to access operations of the digital camera 10, which we will call level 3 privilege, for example, the level 3 user may only be allowed to turn on the digital camera 10, take pictures, browse and process pictures taken by the user himself. The administrator may grant any of the three levels of access to users of the digital camera, add new users to the list of authorized users, remove users from the list of authorized users and amend access privileges of the users in the list of the authorized users.

The fingerprint identification module 60 stores the access privilege settings in the fingerprint information unit 40. Referring to FIG. 2, a schematic layout of information stored in the fingerprint information storage unit 40 is shown in this exemplary embodiment. The fingerprint information storage unit 40 stores different characteristics of the fingerprints, the access privilege settings of the users corresponding to different characteristics of the fingerprints.

Moreover, the fingerprint identification module 60 is used for prompting a current user to input the current user's fingerprint using the fingerprint input interface 20, and comparing characteristics of the user's fingerprint read from the fingerprint input interface 20 with the characteristics of the authorized users' fingerprints stored in the fingerprint information storage unit 40.

If the characteristics of the current user's fingerprint match the characteristics of one of the authorized users' fingerprints, the current user is given access according to their designated level of privilege by the fingerprint identification module 60. If the characteristics of the current user's fingerprint do not match the characteristics of one of the authorized users' fingerprints, the current user may be an unauthorized user. Therefore, the fingerprint identification module 60 completely denies access to operations of the digital camera to the user.

Figure 3:
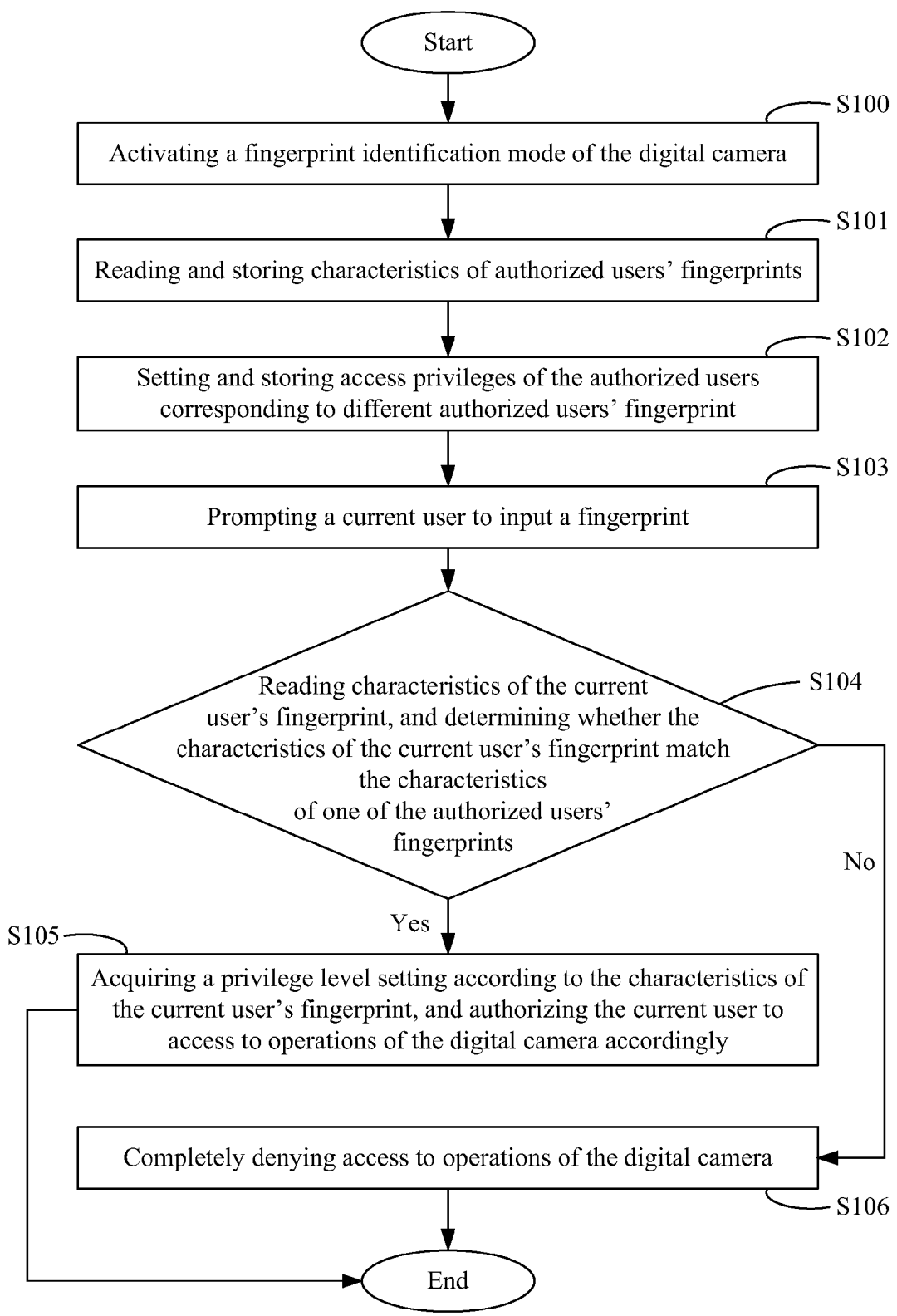
FIG. 3 is a flowchart of a method for using the digital camera of FIG. 1.

Referring to FIG. 3, a flowchart of a method for using the digital camera is shown. The method includes the following steps: in S100, activating a fingerprint identification mode of the digital camera; in S101, reading and storing characteristics of authorized users' fingerprints; in S102, setting and storing access privileges of the authorized users corresponding to different authorized users' fingerprint; in S103, prompting a current user to input a fingerprint; in S104, reading characteristics of the current user's fingerprint, and determining whether the characteristics of the current user's fingerprint match the characteristics of one of the authorized users' fingerprints; if yes, in S105, acquiring a privilege level setting according to the characteristics of the current user's fingerprint, and authorizing the current user to access operations of the digital camera accordingly; if no, in S106, completely denying access to operations of the digital camera.

Since a user of the digital camera has to be identified by the fingerprint identification module 60 before the user operates the digital camera, privacy of the owner and other users of the digital camera is protected.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A digital camera comprising:
   a fingerprint input interface for a current user to input the current user's fingerprint;
   a fingerprint sensor for reading the current user's fingerprint and getting characteristics of the current user's fingerprint;
   a fingerprint information storage unit for storing predefined characteristics of authorized users' fingerprints and at-least-two-different-level access privilege settings of different authorized users; and
   a fingerprint identification module for prompting the current user to input the current user's fingerprint using the fingerprint input interface, for an administrator of the digital camera to set authorities of different users according to the users' fingerprints, for authorizing the current user to access operations of the digital camera according to the at-least-two-different-level access privilege settings if the characteristics of the current user's fingerprint match the predefined characteristics of one of the authorized users' fingerprints, and for denying the current user access to operations of the digital camera if the characteristics of the current user's fingerprint do not match the predefined characteristics of one of the authorized users' fingerprints.

2. The digital camera as claimed in claim 1, wherein the fingerprint identification module is further for allowing the administrator to add new authorized users into a list of the predefined authorized users, for removing one or more authorized users from the list of the predefined authorized users, and for amending the at-least-two-different-level access privilege settings of the different authorized users.

3. A method for using a digital camera, comprising:
   activating a fingerprint identification mode of the digital camera;
   reading and storing characteristics of authorized users' fingerprints;
   setting and storing at-least-two-different-level access privilege settings of the authorized users corresponding to different authorized users' fingerprints;
   prompting a current user to input the current user's fingerprint;
   reading characteristics of the current user's fingerprint, and determining whether the characteristics of the current user's fingerprint match the characteristics of one of the authorized users' fingerprints; and
   acquiring a privilege level setting of the at-least-two-different-level access privilege settings according to the characteristics of the current user's fingerprint, and authorizing the current user to access operations of the digital camera accordingly if the characteristics of the current user's fingerprint match one of the characteristics of the authorized users' fingerprints; or
   completely denying access to operations of the digital camera if the characteristics of the current user's fingerprint do not match the characteristics of one of the authorized users' fingerprints.

\* \* \* \* \*